United States Patent
Carrier

[11] 3,846,533
[45] Nov. 5, 1974

[54] IMPROVEMENTS IN THE MANUFACTURE OF MOLDS FOR FOOTWEAR

[75] Inventor: Joseph D. Carrier, Toronto, Ontario, Canada

[73] Assignee: J. D. Carrier Shoe Co., Limited, Toronto, Ontario, Canada

[22] Filed: Aug. 2, 1972

[21] Appl. No.: 277,265

[30] Foreign Application Priority Data
July 11, 1972 Canada .............................. 146798

[52] U.S. Cl. ................. 264/225, 264/220, 264/255
[51] Int. Cl. ............................................. B29c 1/02
[58] Field of Search .......... 264/219, 220, 225, 226, 264/227, 259, 255; 164/45, 243; 76/107 R

[56] References Cited
UNITED STATES PATENTS

| | | | |
|---|---|---|---|
| 1,866,790 | 7/1932 | Bateman | 264/225 |
| 2,306,516 | 12/1942 | Zahn | 264/220 |
| 3,548,050 | 12/1970 | Mozer | 264/226 |
| 3,723,585 | 3/1973 | Nussbaum | 264/226 |

Primary Examiner—Robert F. White
Assistant Examiner—T. E. Balhoff
Attorney, Agent, or Firm—Fetherstonhaugh & Co.

[57] ABSTRACT

A mold for forming a footwear sole is produced by forming a prototype, securing a face plate to the prototype, rendering the lower surface of the prototype and the lip formed by a face plate electrically sensitive, electroplating the electrically sensitive areas with a metal and thereafter reinforcing the shell by forming a backing on the outer surface of the shell. A complementary mold element may then be formed by coating the upper surface of the shell with a release agent and forming a mold to the contour of the upper surface of the prototype and flange by molding a readily moldable material such as a plastic material or a readily moldable metal thereon. A mold for simultaneously forming a pair of soles in an injection vulcanizing or other molding process may be formed by preparing two molds having a cavity as described, above, positioning these two molds adjacent one another with their cavities arranged in a spaced apart face to face relationship, filling the gap formed between the adjacent molds with a readily moldable material, removing the pattern formed by said readily moldable material and thereafter reproducing said pattern by casting in metal to form a core mountable between said pair of molds. An injection molding passage is formed in the core to open into each of said mold cavities in use. A mold for use in forming footwear comprising a thin metal shell having an inner surface formed to provide a cavity and a flange extending laterally therefrom and a reinforcing backing of a substantial thickness formed on the outer surface of the metal shell.

9 Claims, 7 Drawing Figures

PATENTED NOV 5 1974
3,846,533
SHEET 3 OF 3

IMPROVEMENTS IN THE MANUFACTURE OF MOLDS FOR FOOTWEAR

FIELD OF INVENTION

This invention relates to an improved mold for use in the manufacture of molded soles for footwear, and a method for making same.

PRIOR ART

In the manufacture of molds for use in forming molded soles for footwear, the practice has been to form a pair of mold halves with the required male and female contour of the mold cavity by machining metal blocks to the required contour. While this practice provides molds which are long wearing and extremely useful, the machining costs are such that it is only practical to manufacture these molds where a very large number of soles are to be produced. In view of the frequent style changes which occur in the sole and heel contours of footwear, it is generally not possible to use the same mold year after year until the machining costs have been defrayed by the production of large numbers of molded units.

The high cost of producing molds according to present practice is directly related to the fact that these molds are produced by highly skilled mold makers and a considerable number of costly man-hours are required to machine the mold. In contrast, the mold of the present invention can be produced at considerably less cost than prior molds by reason of the fact that the number of man-hours required for the production of the mold has considerably reduced and it is no longer necessary to retain the services of highly skilled mold makers and machinists. The skill required to produce a prototype in a plastic material or the like is considerably less than that required to produce a mold. Similarly, the plating operation can be carried out by a semi-skilled operator and does not require constant attention by the operator.

In addition to the cost of machining the required contour on the two halves of the mold, care must be taken to ensure that the two halves of the mold are accurately aligned when the mold is assembled. This requires careful measurement and location of centering pins and complementary passages in the two halves of the mold. Footwear soles are used in pairs, left foot and right foot, and it is generally desirable to manufacture the soles in pairs simultaneously so as to ensure an equal number of matching soles will be available.

SUMMARY

The present invention overcomes the difficulties of the prior art described above and provides a simple and inexpensive mold and a method for producing same for use in the production of soles for footwear.

According to an embodiment of the present invention, the method of making a mold element having a mold cavity for molding a footwear sole comprises the steps of forming a prototype having the contour of the sole which is to be molded, securing a face plate to the upper face of the prototype at a position overlying the upper face of the prototype and having a lip projecting laterally therefrom, rendering the lower surface of the lip and the exposed surface of the prototype electrically sensitive by applying a coating of an electrically conducting material thereto, electroplating the electrically sensitive areas with a metal to form a shell having the contour of the prototype and flange, reinforcing the shell by molding a reinforcing backing thereto and removing the face plate and prototype to expose the cavity.

According to a further embodiment of the present invention, a pair of lugs are formed on the face plate projecting outwardly from the outer surface thereof such that corresponding recesses are formed on the inner surface of the flange during plating and thereafter complementary alignment pins are formed on the male mold during formation of the male mold.

According to a still further embodiment of the present invention, a pair of female mold elements are produced as described above and, before the prototypes are removed, the two female molds are placed in a closely adjacent face to face relationship with the upper faces of said prototype facing one another and the space formed between said molds is at least partially enclosed, the space formed between the molds is filled with a readily moldable material capable of molding at a low temperature, the molded material is allowed to set the contour of the upper surfaces of each of said prototypes and their respective flanges to form a pattern, the pattern is then removed and reproduced in metal to provide a metal core locatable between the female molds and having a pair of faces formed to complement the female mold cavities to provide a complete cavity for forming a pair of soles and forming passage means opening through the insert to permit plastic material to enter both chambers in use, and an injection molding operation.

PREFERRED EMBODIMENT

The invention will be more clearly understood after reference to the following detailed specification read in conjunction with the drawings wherein, FIG. 1 is an exploded view of a sole prototype and face plate;

Figure 1:
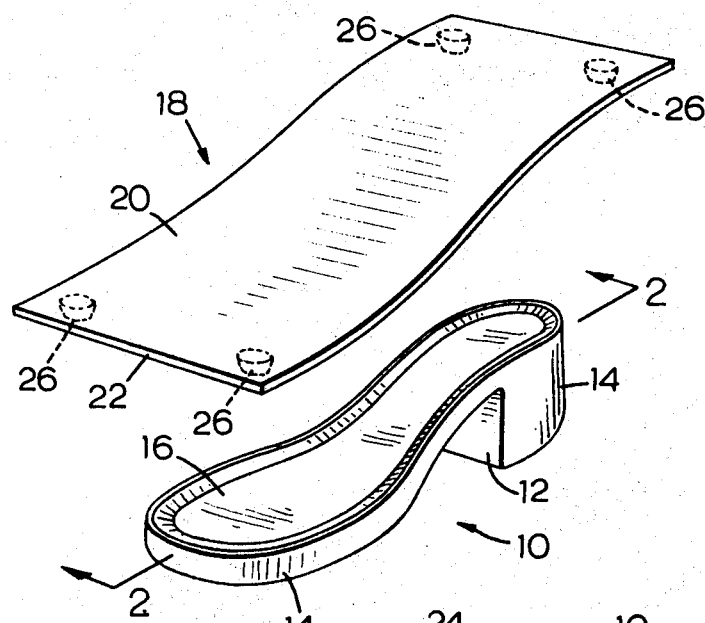
Figure 2:
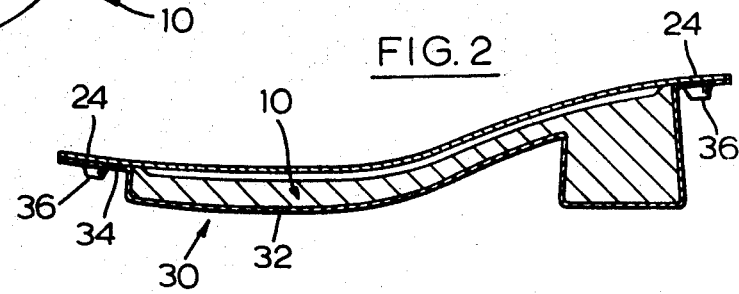
FIG. 2 is a longitudinal cross-sectional view of a sole prototype and face plate after plating with metal.

With reference to the drawings, the reference numeral 10 refers generally to a sole prototype having a contour of the sole to be molded in the mold produced by the method described hereinafter. In the embodiment illustrated in FIG. 1, the prototype is of a left foot sole; however it will be understood that a prototype will be required for each foot. The prototype 10 has a lower surface 12, side surfaces 14 and an upper surface 16, all of which are shaped to the required contour of the sole to be molded. A face plate 18 has an upper surface 20 and a lower surface 22 and it has a longitudinal contour conforming to the longitudinal contour of the prototype. In many instances, the prototype 10 may be made from a soft, flexible plastic material and the face plate 18 serves to retain the prototype 10 in the required longitudinal contour. It is particularly important to preform the curvature of the mold where the sole is to be reinforced with a metal insert during molding. The face plate 18 has a length and width substantially greater than that of the upper surface 16 of the prototype and it is secured relative to the prototype in a position overlying the upper surface 16 by suitable securing means such as staples (not shown) so that the flange 24 is formed about the side edges of the prototype 10. A plurality of lugs 26 are formed on the underside of the flange portion 24.

After the face plate 18 has been secured to the prototype 10, the under surface of the flange 24 and the lower surface 12 and side surfaces 14 of the prototype are coated with a conductive compound to render these surfaces electrically conductive. The compounds that might be used are graphite and silver nitrate, with the latter being preferable. Silver nitrate coating solutions are available commercially and are easily applied by spraying with an air brush. In spraying, it is important to build up a sufficient thickness of silver nitrate to adequately metallize the surface to render it conductive without blocking out fine details formed on the prototype. To accomplish this objective, it is preferable to apply the silver nitrate in two coats, with the first coat being a very light one which will detail surface imperfections which can be filled in with hot wax before application of the second coat. It will be understood that any of the well known methods of rendering the surface of a non-conductor body conductive may be employed.

An alternative method of silvering is to use other commercial equipment which employs a double nozzle spray gun which emits a different solution from each nozzle which on converging on the surface which is to be coated forms a silver coating by a chemical action. This particular process, however, is more time-consuming than that previously described above.

After rendering the required areas of the prototype and face plate conductive, it is plated, either by a conventional electroplating process or by an electroforming process, with the metal selected from the group consisting of nickel, copper, zinc or tin to form a shell 30 having a main body portion 32 and a flange 34 projecting laterally therefrom. The main body portion 32 has an inner surface conforming to the contour of the prototype 10. The flange 34 of the molded shell is formed with protrusions 36, each of which have an inner recessed surface corresponding to the shape of the lugs 26 of the face plate 18.

Preferably the shell is made from a laminate consisting of an inner layer of nickel having a thickness in the range of 0.015 to 0.035 inches and an outer copper layer having a thickness in the range of 0.015 to 0.035 inches.

Figure 3:
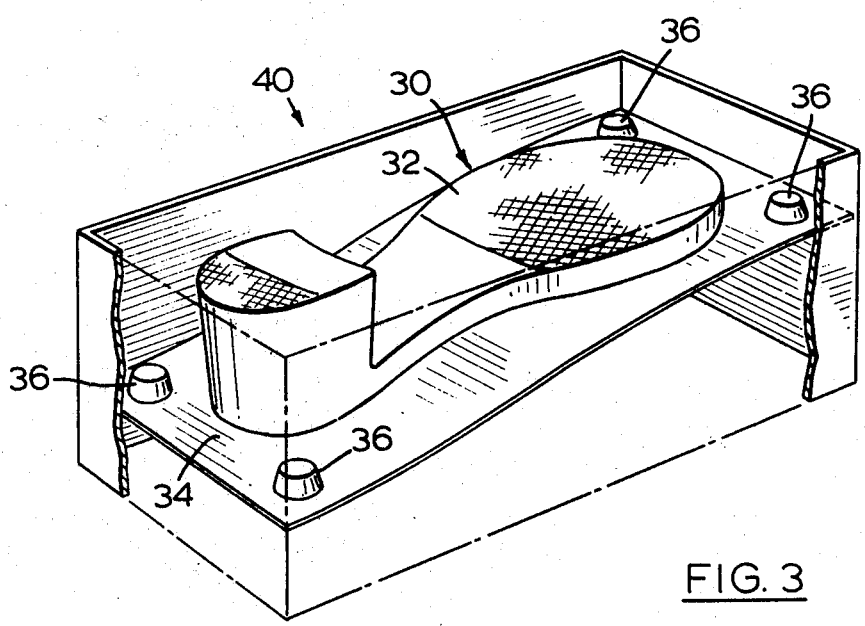
FIG. 3 is a partially sectional pictorial view showing a first step in the reinforcing of the plated shell.

After the shell 30 has been formed by plating, the face plate 18 is removed and the shell with the prototype 10 is located in the mold housing 40 as shown in FIG. 3 of the drawings. A reinforcing backing for the shell 30 is formed by filling the cavity surrounding the shell 30 with a readily moldable material such as an epoxy resin having metallic powder inclusions or a metal alloy. The reinforcing backing has a thickness at least 20 times that of the shell. A suitable plastic material for use as a reinforcing backing is known by the trade mark "DEVCON" available from Devcon Canada Limited; a suitable metal backing is known by the trade mark "KIRKSITE" and is available from Canada Metal Company Limited, Toronto, Ontario. After the reinforcing backing has set to the contour of the under surface of the shell, the shell and backing may be removed from the mold housing and the prototype may be removed from the shell so as to provide a female mold element 44, as shown in the lower section of FIG. 5 of the drawings. The female mold consists of the metal shell 30 which includes the main body portion 32 formed to provide a cavity corresponding to the shape of the lower and side surfaces of the prototype and a flange 34 projecting laterally therefrom. Four recesses 38 are formed in the flange to serve to align the female mold with a second mold section as will be described hereinafter. Where the upper surface of the molded item is to be plain and flat, the second mold half may be simply a flat plate adapted to extend over the open end of the cavity of the shell. A female mold in combination with a plain flat section may conveniently be used in a foam molding operation for forming soles in a well known manner. The female mold section 44 may also be used in injection molding operation by providing an upper mold section suitably ported and vented for injecting plastic material into the mold cavity.

Figure 4:
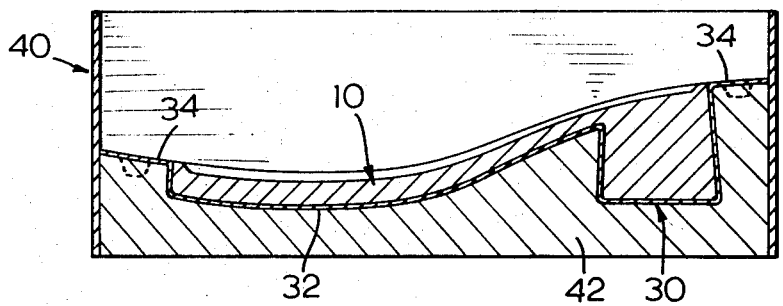
FIG. 4 is a longitudinal section through a mold prior to the formation of the male mold element.
Figure 5:
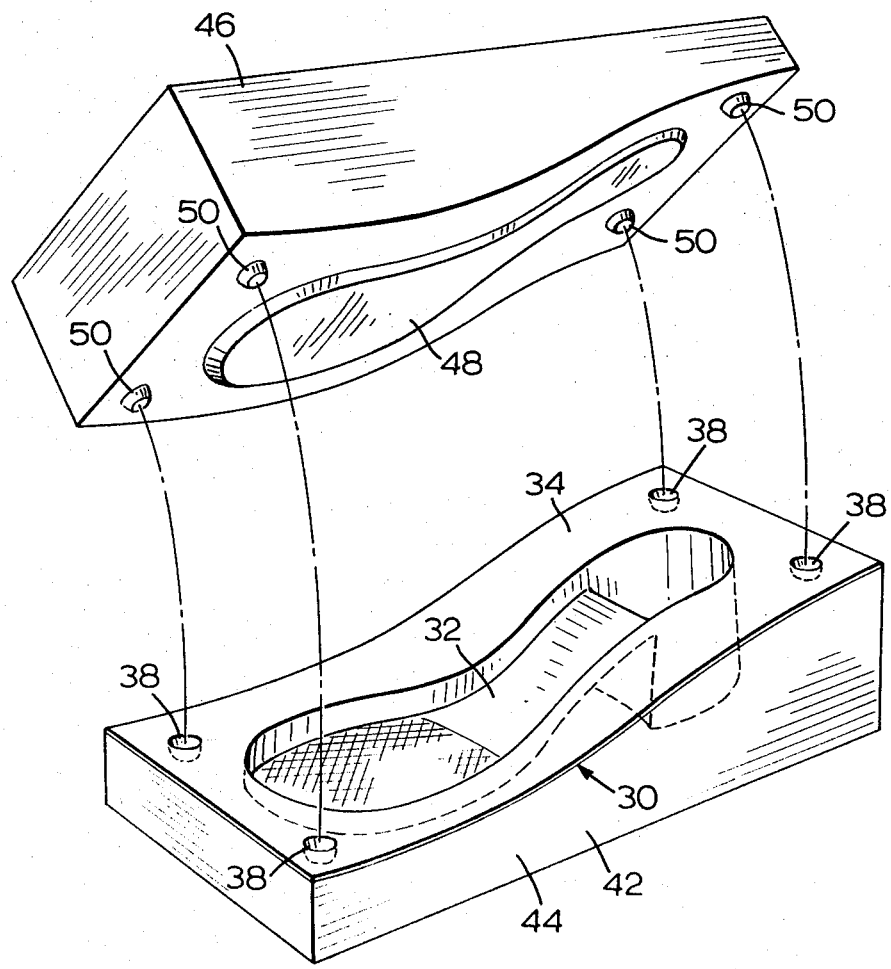
FIG. 5 is an exploded view of a pair of complementary mold elements according to an embodiment of the present invention.
Figure 6:
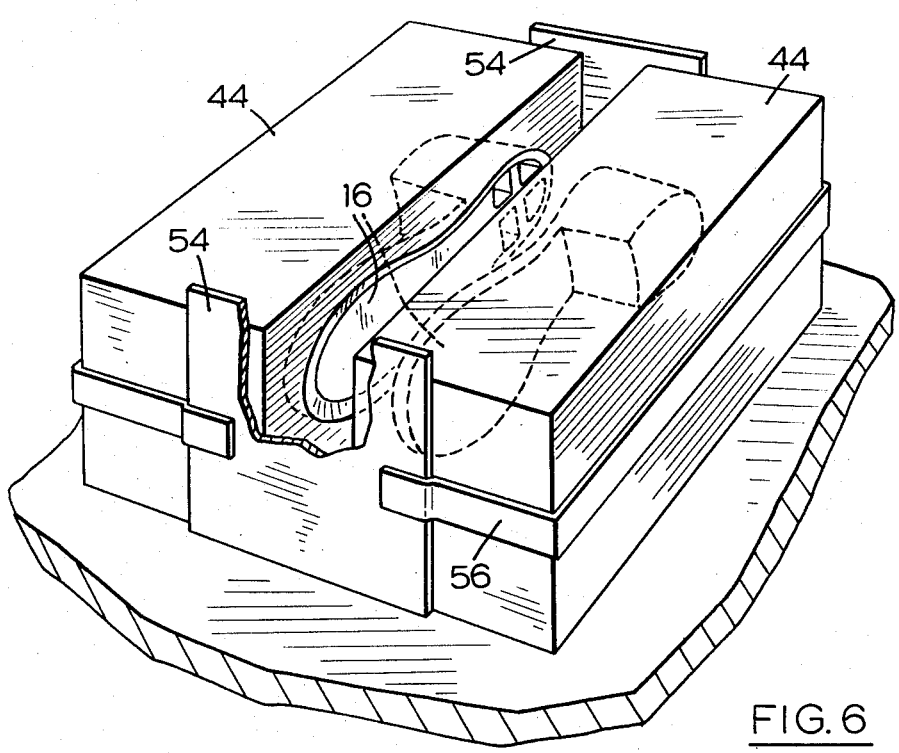
FIG. 6 is a pictorial view illustrating a step in the method of producing a core for use in simultaneous molding of two sole elements.
Figure 7:
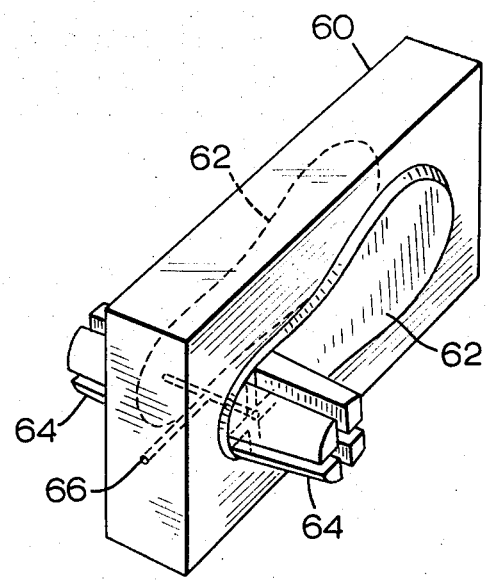
FIG. 7 is a pictorial view of a core suitable for use in the simultaneous production of a pair of molded sole members.

If it is desired to form a second mold section having a contoured surface corresponding to the shape of the upper surface of the prototype, the mold housing 40 is inverted to the position shown in FIG. 4 before the female mold section is removed from the mold housing and before the prototype is removed from the shell. The upper surface of the flange 34 and the upper surface of the prototype 10, including the inner surfaces of the recesses 36, are coated with a suitable release agent and thereafter the mold housing is filled with a readily moldable plastic material such as epoxy resin including metallic powder inclusions. Alternatively, if it is necessary to make the second mold section in the form of a metal casting, the mold housing may be filled with a plaster compound which is subsequently used as a pattern in a metal molding process so as to be reproduced in metal. The second or male mold section 46 is illustrated in FIG. 5 of the drawings and has a raised portion 48 corresponding to the shape of the upper surface of the prototype and four lugs 50 corresponding to and alignable with the recesses 38 formed in the flange 34 of the metal shell. When the lugs 50 are located in the recesses 38, the raised section 48 is automatically aligned with respect to the cavity. The form of mold illustrated in FIG. 5 of the drawings is particularly suitable for use in the foam molding of soles for footwear. However, it may also be used to advantage in all of the well known sole molding processes which require a mold of the type including vulcanized molds, EVA molds and injection molds. A further embodiment of the present invention is illustrated in FIGS. 6 and 7 of the drawings wherein two female mold sections 44, with their prototype located within the cavities of the shell, are located in a spaced apart face to face relationship to form a passage 52 between the faces thereof. Preferably one of the female molds is designed to produce a sole for the right foot and the other is designed to produce a sole for the left foot, so that a pair of matching soles may be produced by filling the cavities of each mold. The ends of the passage 52 are closed by means of end plates 54 which are supported by a frame 56. The space formed between the molds 44 is then filled with a readily moldable material such as a plaster, an epoxy resin or the like. The plaster conforms to the contour of the upper surface of the prototype 10 of each mold and extends over the flanges 34 to the edges of the female mold. After the plaster or epoxy pattern has set, it may be used as a core in a molding operation. Alternatively, it may be used as a pattern in a metal molding operation so as to provide a metal core member 60 as shown in FIG. 7 of the drawings. The metal core is particularly suitable for production runs in an injection molding operation. However, it will be understood that an epoxy core may be suitable for short run injection molding operation. Core member 60 will have a surface portion 62 on each of the side faces thereof corresponding in shape to the shape of the upper surface of the prototypes. In the embodiment illustrated in FIG. 7, heel core elements 64 are shown projecting outwardly from the core 60. The heel core elements 64 serve to form passages in the molded heel so as to lighten the weight of the end product. An injection molding passage 66 extends through the core 60 from one end thereof and opens outwardly from each face of the core in the area of the heel core sections. The core plate 60 is also suitably vented for use in an injection molding operation.

In order to produce a pair of soles by an injection molding or vulcanizing operation, the core plate 60 is located between the two female mold sections 44 and plastic material is injected or placed into the cavity formed therebetween by way of the passage 66.

From the foregoing, it will be apparent that the present invention provides a simple and inexpensive method for producing molds for use in the production of molded soles for footwear by means of a molding process such as polyvinyl foam molding, ethylvinylacetate molding, vulcanizing, injection molding or the like. The method does not require the expensive metal machining processes of the prior art and, therefore, provides a substantial saving in the cost of molds, with the result that it is possible to use this method to produce molds for use in short-run molding operations.

I claim:

1. A method of making a mold element having a mold cavity for molding a footwear sole comprising the steps of
   a. forming a prototype having an upper surface, a lower surface and side surfaces conforming to the shape of the sole which is to be produced by molding,
   b. securing a face plate, which is deformable to the longitudinal curvature of the upper surfaces of the prototype and having a length and width which is greater than the length and width of the prototype, to the prototype in a position overlying the prototype and projecting laterally therefrom to form a lip having a lower surface extending about the prototype,
   c. rendering the lower surface of the lip and the lower and side surfaces of the prototype electrically sensitive by applying a coating of an electrically conductive material thereto,
   d. electroplating the electrically sensitive areas with a metal selected from the group consisting of nickel, copper, zinc and tin to form a metal shell consisting of a main body portion and a flange projecting laterally therefrom, said main body portion having an inner surface formed to provide a cavity conforming to the shape of the lower and side surfaces of the prototype, said main body portion and said flange having an outer surface,
   e. forming a reinforcing backing on said outer surface of said main body portion and said flange by molding a body of settable material thereon,
   f. removing said face plate and prototype to expose said cavity, and
   g. forming a complementary closure mold element for closing said female mold element during molding of said footwear sole.

2. A method of making a mold element as claimed in claim 1 wherein said electrically sensitive areas are plated with nickel and thereafter plated with copper to form a nickel/copper laminate.

3. A method as claimed in claim 2 wherein said nickel coating has a thickness within the range of 0.015 to 0.035 inches and a copper coating having a thickness within the range of 0.015 to 0.035 inches.

4. A method as claimed in claim 1 wherein said reinforcing backing is formed from a plastic material reinforced by metal inclusions.

5. A method as claimed in claim 1 wherein said reinforcing backing is formed from a readily moldable material.

6. A method of making a mold consisting of a male and female element for molding a footwear sole comprising the steps of
   a. forming a prototype having a lower surface, side surfaces and an upper surface conforming to the shape of the sole which is to be produced by molding,
   b. securing a face plate having a length and width which is greater than that of the upper surface of the prototype to the prototype in a position overlying the upper surface thereof to obscure the upper surface of the prototype and to project laterally therefrom to form a lip having an under surface extending about the prototype,
   c. rendering the lower surface of the lip and the lower outside surfaces of the prototype electrically sensitive by applying a coating of an electrically conductive material thereto,
   d. electroplating the electrically sensitive areas with a metal selected from the group consisting of nickel, copper, zinc or tin to form a metal shell consisting of a main body portion and a flange projecting laterally therefrom, said main body portion having an inner surface formed to provide a cavity conforming to the shape of the lower and side surfaces of the prototype and an outer surface, said flange projecting laterally from the upper edge of said main body portion and having an inner and outer surface coextensive with the inner and outer surface of said main body portion,
   e. forming a reinforcing backing on said outer surface of said main body portion and said flange by molding a body of settable material thereon,
   f. removing said face plate and coating said inner surface of said flange and said upper surface of said prototype with a release agent,
   g. forming a male mold to the contour of said inner surface of said flange and said upper surface of said prototype by molding a body of settable material thereon, h. separating said male and female molds and removing said prototype to expose said cavity of said shell.

7. A method as claimed in claim 6 wherein said face plate is formed with lug means projecting outwardly from the outer surface thereof such that corresponding recesses are formed in the inner surface of said flange during plating and thereafter complementary alignment pins are formed on said male mold during the formation of said male mold for aligning said male and female mold elements in use.

8. A method of making a mold for molding footwear comprising the steps of
  a. forming a prototype having an upper surface, a lower surface, side surfaces and an upper surface conforming to the shape of the sole which is to be produced by molding, the upper surface having a longitudinal curvature,
  b. securing a face plate, which is deformable to the longitudinal curvature of the upper surface of the prototype and having a length and width which is greater than that of the prototype, to the prototype in a position overlying the upper surface of the prototype to secure the upper surface of the prototype and project laterally therefrom to form a lip having an under surface extending about the prototype,
  c. rendering the lower surface of the lip and the lower and side surfaces of the prototype electrically sensitive by applying a coating of an electrically conductive material thereto,
  d. plating the electrically sensitive areas with one or more metals selected from the group consisting of nickel, copper, zinc and tin to form a metal shell consisting of a main body portion and a flange projecting laterally therefrom, said main body portion having an inner surface formed to provide a cavity conforming to the shape of the lower and side surfaces of the prototype and an outer surface, said flange having inner and outer surfaces coextensive with the inner and outer surfaces of said main body portion,
  e. mounting said metal shell with said prototype and with or without said face plate attached thereto in a mold housing with said outer surfaces of said main body portion and said flange spaced inwardly from one open end of said mold housing and said inner surface of said flange and said upper surface of said prototype spaced inwardly from a second open end of said mold housing, the side edges of said flange extending to the side walls of said housing and dividing the mold housing into two distinct compartments,
  f. loading said one open end to fill one of said compartments of said mold housing with a settable reinforcing material and allowing said material to set to form a reinforcing backing which is secured to said shell,
  g. coating the upper surface of said prototype and the inner surface of said flange with a release agent,
  h. loading said second open end of said mold housing to fill the other of said compartments of said housing with a settable reinforcing material and allowing said material to set to conform to the shape of said upper surface of said prototype and said inner surface of said flange,
  i. opening said mold set and removing said prototype to expose said cavity of said shell.

9. A method of forming a mold for use in the simultaneous molding of a pair of footwear soles comprising the steps of
  a. forming a pair of complementary sole prototypes, each having a lower surface, side surfaces and an upper surface conforming to the shape of one of the soles which is to be produced by molding,
  b. securing a face plate having a length and width which is greater than that of the upper surface of the prototypes to each phototype in a position overlying the upper surface thereof and projecting laterally therefrom to form a lip having an under surface extending about each prototype,
  c. rendering the lower surfaces of the lip and the lower and side surfaces of the pattern of each set electrically sensitive by applying a coating of electrically conductive material thereto,
  d. plating the electrically sensitive areas with a metal selected from the group consisting of nickel, copper, zinc to form a pair of metal shells consisting of a main body portion and a flange portion projecting laterally therefrom, said main body portion having an inner surface formed to provide a cavity conforming to the shape of the lower and side surfaces of the prototype and an outer surface, said flange having an inner and outer surface coextensive with the inner and outer surfaces of said main body portion,
  e. forming a reinforcing backing on the outer surface of said main body portion and said flange of each shell by molding a body of suitable material thereon to provide two female mold elements,
  f. removing said face plates to expose the upper surface of each of said prototypes and said flange,
  g. placing said female molds closely adjacent to one another with the upper faces of said prototypes facing one another and at least partially enclosing said space formed therebetween,
  h. filling the space formed between said molds with a readily moldable material capable of being molded at a low temperature and allowing said material to set to the contour of the upper surfaces of each of said prototypes and their respective flanges to form a core pattern, and
  i. thereafter removing the core pattern and prototypes to provide a core for use with said two female molds.

* * * * *